United States Patent
Shetty et al.

(10) Patent No.: US 10,827,005 B2
(45) Date of Patent: Nov. 3, 2020

(54) SYSTEMS AND METHODS OF GROUP AUTOMATION FOR MULTI-CHASSIS MANAGEMENT

(71) Applicant: Dell Products L.P., Round Rock, TX (US)

(72) Inventors: Sudhir Vittal Shetty, Cedar Park, TX (US); Prakash Nara, Round Rock, TX (US); Stephanos S. Heracleous, Leander, TX (US); Jacob R. Hutcheson, Round Rock, TX (US); Balaji Shanmugam, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 45 days.

(21) Appl. No.: 15/446,848

(22) Filed: Mar. 1, 2017

(65) Prior Publication Data
US 2018/0255020 A1    Sep. 6, 2018

(51) Int. Cl.
| H04L 29/06 | (2006.01) |
| H04L 29/08 | (2006.01) |
| H04L 12/24 | (2006.01) |
| H04L 29/12 | (2006.01) |

(52) U.S. Cl.
CPC ............ *H04L 67/16* (2013.01); *H04L 41/042* (2013.01); *H04L 41/30* (2013.01); *H04L 61/1511* (2013.01); *H04L 61/1541* (2013.01)

(58) Field of Classification Search
USPC ............ 726/3, 2, 21, 36; 713/150, 163, 181; 380/255, 264, 276
See application file for complete search history.

(56) References Cited

U.S. PATENT DOCUMENTS

| 2008/0043769 A1* | 2/2008 | Hirai | H04L 41/042 370/420 |
| 2008/0098390 A1* | 4/2008 | Karstens | G06F 8/60 717/178 |
| 2009/0132799 A1* | 5/2009 | Brumley | G06F 9/44505 713/100 |
| 2010/0146592 A1* | 6/2010 | Gamare | H04L 41/0695 726/4 |
| 2011/0252240 A1* | 10/2011 | Freedman | H04L 63/02 713/169 |
| 2012/0331119 A1* | 12/2012 | Bose | H04L 61/2015 709/223 |
| 2013/0064102 A1* | 3/2013 | Chang | H04L 45/245 370/244 |

(Continued)

*Primary Examiner* — Sharif E Ullah
(74) *Attorney, Agent, or Firm* — Jackson Walker L.L.P.

(57) ABSTRACT

In accordance with embodiments of the present disclosure, a system may include a plurality of chassis, each chassis comprising a plurality of information handling systems and a private inter-chassis network configured to couple the plurality of chassis to one another. Each chassis of the plurality of chassis may be configured to advertise a message to the private inter-chassis network, the message comprising information regarding such chassis. The plurality of chassis may detect the presence of each other based on messages advertised from each chassis and the plurality of chassis may nominate a lead chassis from the plurality of chassis to serve as a single point of management of the system.

6 Claims, 2 Drawing Sheets

(56) References Cited

U.S. PATENT DOCUMENTS

| | | | |
|---|---|---|---|
| 2013/0117766 A1* | 5/2013 | Bax | G06F 9/4405 719/323 |
| 2014/0229758 A1* | 8/2014 | Richardson | G06F 11/2007 714/4.11 |
| 2014/0286345 A1* | 9/2014 | Mohandas | H04L 49/25 370/401 |

* cited by examiner

SYSTEMS AND METHODS OF GROUP AUTOMATION FOR MULTI-CHASSIS MANAGEMENT

TECHNICAL FIELD

The present disclosure relates in general to information handling systems, and more particularly to providing automation of group formation for multi-chassis management of multiple chassis configured to each receive a plurality of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A user who manages a system of multiple information handling system chassis may desire to have a single point of management of the multiple chassis. However, configuring chassis management controllers to support such a single point of management has disadvantages. Existing approaches to such configuration involve numerous sequences of manual steps which are laborious and prone to error.

SUMMARY

In accordance with the teachings of the present disclosure, certain disadvantages and problems associated with formation of a multi-chassis management group have been reduced or eliminated.

In accordance with embodiments of the present disclosure, a system may include a plurality of chassis, each chassis comprising a plurality of information handling systems and a private inter-chassis network configured to couple the plurality of chassis to one another. Each chassis of the plurality of chassis may be configured to advertise a message to the private inter-chassis network, the message comprising information regarding such chassis. The plurality of chassis may detect the presence of each other based on messages advertised from each chassis and the plurality of chassis may nominate a lead chassis from the plurality of chassis to serve as a single point of management of the system.

In accordance with these and other embodiments of the present disclosure, a method may include advertising, by each chassis of a plurality of chassis wherein each chassis comprises a plurality of information handling systems, a message regarding such chassis to a private inter-chassis network configured to couple the plurality of chassis to one another. The method may also include detecting, by each chassis, the presence of each other based on messages advertised from each chassis. The method may further include nominating, by the plurality of chassis, a lead chassis from the plurality of chassis to serve as a single point of management of a system comprising the plurality of chassis.

In accordance with these and other embodiments of the present disclosure, chassis management controller may be to advertise a message regarding a chassis comprising the chassis management controller to a private inter-chassis network configured to couple the chassis to one or more other chassis, detect the presence of the one or more other chassis based on messages advertised from each of the one or more chassis, and in concert with one or more management controllers integral to the one or more chassis, nominate a lead chassis from a plurality of chassis comprising the chassis and the one or more other chassis to serve as a single point of management of a system comprising the plurality of chassis.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
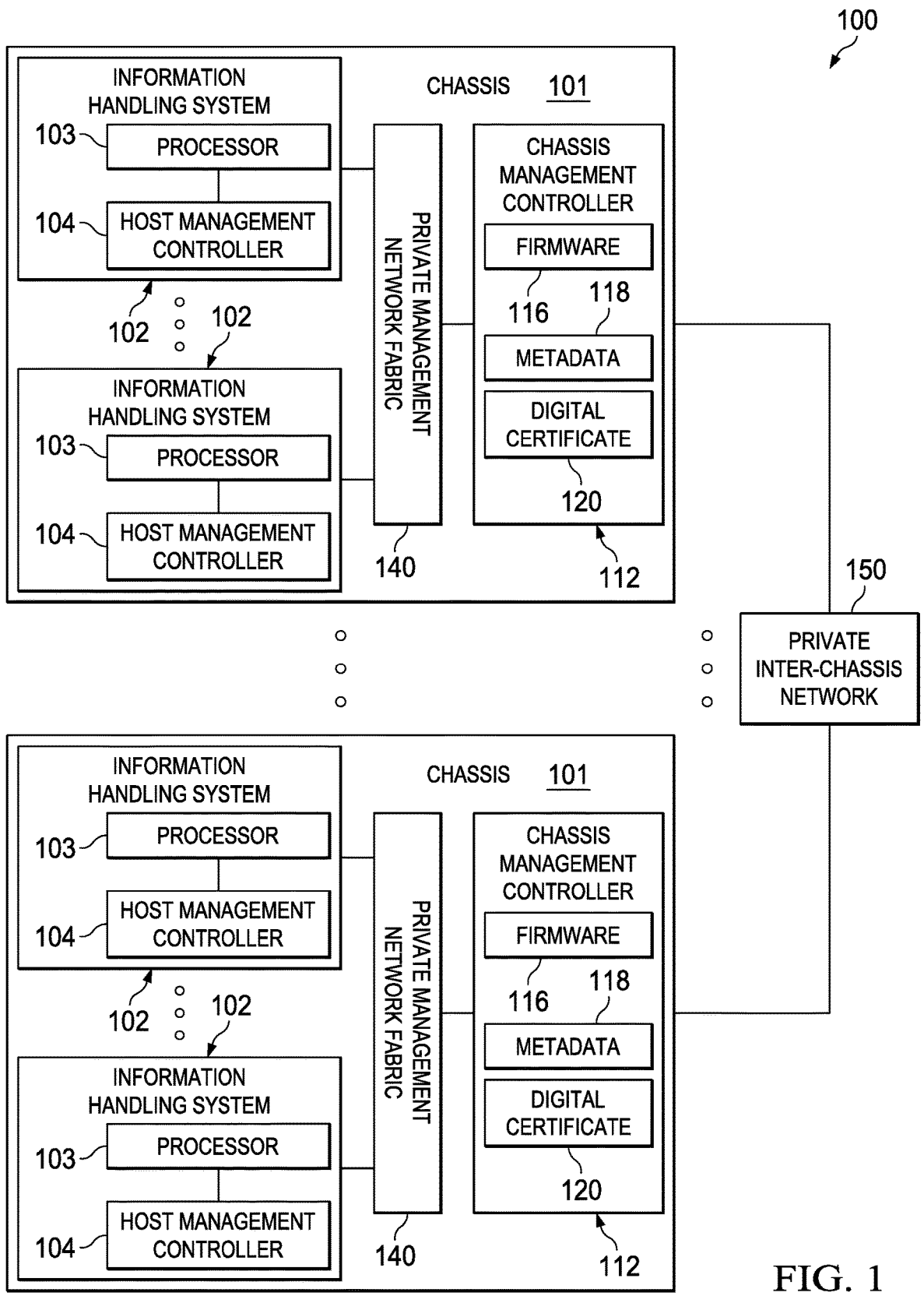
FIG. 1 illustrates a block diagram of a system comprising multiple system chassis each with multiple modular information handling systems disposed therein, in accordance with embodiments of the present disclosure.
Figure 2:
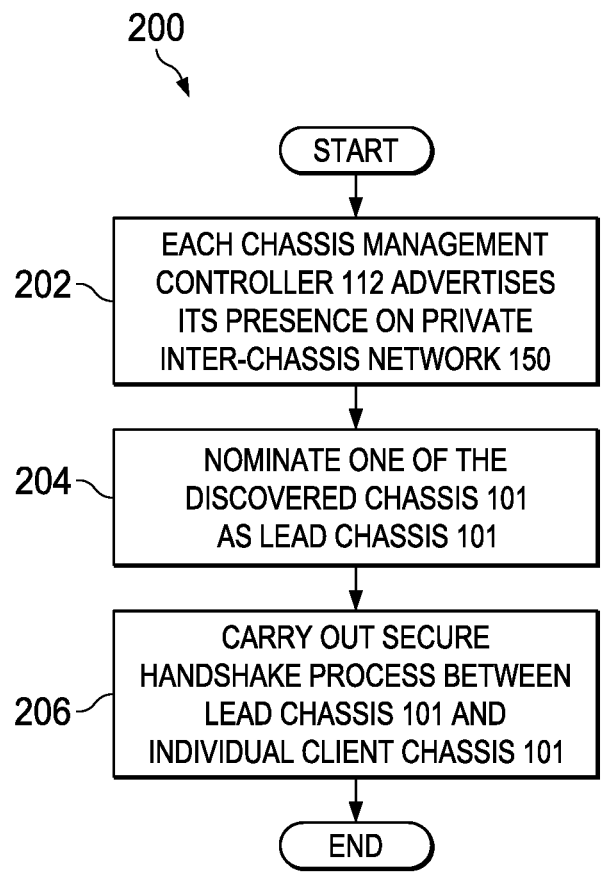
FIG. 2 illustrates a flow chart of an example method of group automation for multi-chassis management, in accordance with embodiments of the present disclosure.

Preferred embodiments and their advantages are best understood by reference to FIGS. 1 and 2, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

FIG. 1 illustrates a block diagram of a system 100 comprising multiple system chassis 101 each with multiple modular information handling systems 102 disposed therein, in accordance with embodiments of the present disclosure. As depicted in FIG. 1, system 100 may comprise a plurality of chassis 101, each chassis 101 including a plurality of information handling systems 102, a private management network fabric 140, and a chassis management controller 112. In addition to information handling systems 102, private management network fabric 140, and chassis management controller 112, a chassis 101 may include one or more other information handling resources. System 100 may also include a private inter-chassis network 150 coupling chassis management controllers 112 of the various chassis 101 together.

An information handling system 102 may generally be operable to receive data from and/or communicate data to one or more information handling resources of chassis 101, including communicating with chassis management controller 112 via private management network fabric 140. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and a host management controller 104. In addition to processor 103 and host management controller 104, information handling system 102 may include one or more other information handling resources.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory or other computer-readable media accessible to processor 103.

Information handling system 102 may include a host management controller 104. Host management controller 104 may be implemented by, for example, a microprocessor, microcontroller, DSP, ASIC, EEPROM, or any combination thereof. Host management controller 104 may be configured to communicate with chassis management controller 112. Such communication may be made, for example, via private management network fabric 140. Host management controller 104 may be configured to provide out-of-band management facilities for management of information handling system 102. Such management may be made by information handling resources of chassis 101 even if information handling system 102 is powered off or powered to a standby state. Host management controller 104 may include a processor, memory, and network connection separate from the rest of information handling system 102. In certain embodiments, host management controller 104 may include or may be an integral part of a baseboard management controller (BMC) or an Integrated Dell Remote Access Controller (iDRAC).

Chassis management controller 112 may comprise any system, device, or apparatus configured to facilitate management and/or control of system 100 embodied by chassis 101, its information handling systems 102, and/or one or more of its component information handling resources. Chassis management controller 112 may be configured to issue commands and/or other signals to manage and/or control an information handling system 102 and/or information handling resources of system 100. Chassis management controller 112 may comprise a microprocessor, microcontroller, DSP, ASIC, field programmable gate array ("FPGA"), EEPROM, or any combination thereof. In some embodiments, chassis management controller 112 may provide a management console for user/administrator access to these functions. For example, chassis management controller 112 may implement Representational State Transfer ("REST") or another suitable management protocol permitting a user to remotely access chassis management controller 112 to configure system 100 and its various information handling resources. In such embodiments, chassis management controller 112 may interface with a network interface, thus allowing for "out-of-band" control of system 100, such that communications to and from chassis management controller 112 are communicated via a management channel physically isolated from an "in-band" communication channel of chassis 101 for which non-management communication may take place. Thus, for example, if a failure occurs in system 100 that prevents an administrator from interfacing with system 100 via the in-band communication channel or a user interface associated with chassis 101 (e.g., power failure, etc.), the administrator may still be able to monitor and/or manage system 100 (e.g., to diagnose problems that may have caused failure) via chassis management controller 112. In the same or alternative embodiments, chassis management controller 112 may allow an administrator to remotely manage one or more parameters associated with operation of system 100 and its various information handling resources (e.g., power usage, processor allocation, memory allocation, security privileges, etc.). In some embodiments, chassis management controller 112 may include a management services module.

As shown in FIG. 1, chassis management controller 112 may include firmware 116, metadata 118, and digital certificate 120. Firmware 116 may comprise a program of executable instructions configured to, when executed by a processor (e.g., a processor internal to chassis management controller 112), carry out the functionality of chassis management controller 112.

Metadata 118 may include any number of databases, lists, tables, maps, and/or other suitable data structures configured to set forth identifying and/or group configuration information for the chassis management controller 112 in which the metadata 118 resides and/or identifying and/or group configuration information for other chassis management controllers coupled via private inter-chassis network 150.

A digital certificate 120 may comprise an electronic document used to authenticate the identity of a chassis, as described in further detail below.

Private management network fabric 140 may comprise a network and/or fabric configured to couple information handling systems 102 (e.g., via host management controller 104) and chassis management controller 112 to each other and/or one or more other information handling resources of chassis 101. In these and other embodiments, private management network fabric 140 may include a communication infrastructure, which provides physical connections, and a management layer, which organizes the physical connections and information handling resources communicatively coupled to private management network fabric 140. Private management network fabric 140 may be implemented as, or may be a part of, an Ethernet local area network (LAN) or any other appropriate architecture or system that facilitates the communication of signals, data, and/or messages.

Private inter-chassis network 150 may comprise a network and/or fabric configured to couple information chassis management controllers 112 of the various chassis 101 in system 100 to each other. In these and other embodiments, inter-chassis network 150 may include a communication infrastructure, which provides physical connections, and a management layer, which organizes the physical connections and chassis management controllers 112 communicatively coupled to private inter-chassis network 150. Private inter-chassis network 150 may be implemented as, or may be a part of, an Ethernet local area network (LAN) or any other appropriate architecture or system that facilitates the communication of signals, data, and/or messages.

FIG. 2 illustrates a flow chart of an example method 200 of group automation for multi-chassis management, in accordance with embodiments of the present disclosure. According to some embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, in response to the various chassis 101 being coupled to private inter-chassis network 150 and powered on, each chassis management controller 112 may advertise its presence on private inter-chassis network 150 (e.g., by using a private IPv6 address). Such advertisement may be communicated over multicast Domain Name Service (mDNS), and such advertisement may include information regarding the identity of the chassis 101 and/or chassis management controller 112 (e.g., chassis service tag number or serial number, chassis model) from which the advertisement originates (e.g., which information a chassis management controller 112 may obtain from its metadata 118). In some embodiments, such advertisement may also include configuration (e.g., hardware inventory of information handling resources) and/or policy information regarding the chassis 101 and/or chassis management controller 112 from which the message originated (e.g., membership in a particular group of chassis 101). Accordingly, each chassis 101 may be able to detect the presence of other chassis 101 in system 100. Accordingly, chassis 101 are able to discover one another on private inter-chassis network 150 without requiring the entry of credentials.

At step 204, after each chassis 101 has detected the presence of other chassis 101, one of the chassis 101 may be nominated as the "lead" chassis 101 which may serve as a user's single point of management of system 100. In some embodiments, a rules-based approach will be used to nominate the lead chassis 101. Examples of rules-based approaches may include nominating a lead chassis 101 based on its hardware profile (e.g., based on the presence or absence of one or more particular information handling resources), nominating a lead chassis 101 based on its position within system 100 (e.g., in a rack-based system 100, select the top most chassis 101 in the rack system), etc.

At step 206, after a lead chassis 101 is nominated, the lead chassis 101 may initiate a secure handshake process (e.g., based on OAuth) to verify the identities of the other chassis 101. Such verification may take place based on digital certificates 120 stored within the chassis management controllers 112 (or elsewhere) within the individual chassis 101. For example, the nominated lead chassis 101 may be able to initiate the handshake registration process by communicating a message to a client chassis 101. As used herein, a "client chassis" refers to a chassis 101 not nominated as the lead chassis 101. In response, a client chassis 101 may return to the lead chassis client identification and its digital certificate 120, which the lead chassis may authenticate through a challenge/response mechanism. The handshake process may also pass on client identification information and a handshake response to verify the authenticity of the lead chassis' digital certificate 120. In addition, responsive to the handshake process verifying the authenticity, the client chassis 101 may provide an access token to the lead chassis 101 that may be used for subsequent communications. Accordingly, a secure handshake may take place based on factory-installed certificates within the respective chassis 101. In addition, using the foregoing steps, group management operations in system 100 may be automated.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100, and/or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A system comprising:
    a plurality of chassis, each chassis comprising a plurality of information handling systems; and
    a private inter-chassis network configured to couple the plurality of chassis to one another;
    wherein:
        each chassis of the plurality of chassis is configured to advertise, via a chassis management controller of such chassis, a message to the private inter-chassis network, the message comprising information regarding a hardware configuration of such chassis and a physical location of such chassis within the system, wherein the message is advertised via multicast Domain Name Service (mDNS);
        the plurality of chassis are configured to detect, via respective chassis management controllers thereof, the presence of each other based on the messages advertised from each chassis; and
        the plurality of chassis are configured to nominate a lead chassis from the plurality of chassis to serve as a single point of management of the system, wherein the lead chassis is nominated based on application of one or more nomination rules to the respective hardware configurations of each chassis and the respective physical locations of each chassis within the system, and wherein the lead chassis is further configured to initiate a secured handshake process with each of the other of the plurality of chassis to establish trust with the other of the plurality of the chassis based on factory-installed certificates present on each of the plurality of chassis.

2. The system of claim 1, wherein the plurality of chassis are disposed within a rack, and wherein the physical location of the chassis within the system is a position within the rack.

3. A method comprising:
    advertising, by respective chassis management controllers of each chassis of a plurality of chassis, wherein each chassis comprises a plurality of information handling systems, a message regarding such chassis to a private inter-chassis network configured to couple the plurality of chassis to one another, the message comprising information regarding a hardware configuration of such chassis and a physical location of such chassis within the system, wherein the message is advertised via multicast Domain Name Service (mDNS);
    detecting, by the respective chassis management controllers of each chassis, the presence of each other based on the messages advertised from each chassis; and
    nominating, by the plurality of chassis, a lead chassis from the plurality of chassis to serve as a single point of management of a system comprising the plurality of chassis, wherein the lead chassis is nominated based on application of one or more nomination rules to the respective hardware configurations of each chassis and the respective physical locations of each chassis within the system, and wherein the lead chassis is further configured to initiate a secured handshake process with each of the other of the plurality of chassis to establish trust with the other of the plurality of the chassis based on factory-installed certificates present on each of the plurality of chassis.

4. The method of claim 3, wherein the plurality of chassis are disposed within a rack, and wherein the physical location of the chassis within the system is a position within the rack.

5. A chassis management controller configured to:
    advertise a message regarding a chassis comprising the chassis management controller to a private inter-chassis network configured to couple the chassis to one or more other chassis, wherein the message includes information regarding a hardware configuration of the chassis and a physical location of such chassis, wherein the message is advertised via multicast Domain Name Service (mDNS);
    detect the presence of the one or more other chassis based on messages advertised from each of the one or more other chassis; and
    in concert with one or more management controllers integral to the one or more other chassis, nominate a lead chassis from a plurality of chassis comprising the chassis and the one or more other chassis to serve as a single point of management of a system comprising the plurality of chassis, wherein the lead chassis is nominated based on application of one or more nomination rules to the respective hardware configurations of each chassis and the respective physical locations of each chassis, and wherein the lead chassis is further configured to initiate a secured handshake process with each of the other of the plurality of chassis to establish trust with the other of the plurality of the chassis based on factory-installed certificates present on each of the plurality of chassis.

6. The chassis management controller of claim 5, wherein the plurality of chassis are disposed within a rack, and wherein the physical location of the chassis within the system is a position within the rack.

* * * * *